United States Patent
Lee et al.

(10) Patent No.: US 7,639,911 B2
(45) Date of Patent: Dec. 29, 2009

(54) OPTICAL DEVICE HAVING OPTICAL WAVEGUIDE INCLUDING ORGANIC BRAGG GRATING SHEET

(75) Inventors: Myung Hyun Lee, Daejeon (KR); Min Su Kim, Daejeon (KR); Jung Jin Ju, Daejeon (KR); Seung Koo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/437,892

(22) Filed: May 19, 2006

(65) Prior Publication Data

US 2007/0133920 A1    Jun. 14, 2007

(30) Foreign Application Priority Data

Dec. 8, 2005    (KR) ............... 10-2005-0120173
Feb. 27, 2006    (KR) ............... 10-2006-0018871

(51) Int. Cl.
*G02B 6/34* (2006.01)
*G02F 1/295* (2006.01)

(52) U.S. Cl. .......................... 385/37; 385/10
(58) Field of Classification Search ............ 385/37, 385/10

See application file for complete search history.

(56) References Cited

U.S. PATENT DOCUMENTS

| 4,006,963 | A | * | 2/1977 | Baues et al. ............ 385/37 |
| 4,796,274 | A |   | 1/1989 | Akiba et al. |
| 5,195,161 | A | * | 3/1993 | Adar et al. ............ 385/129 |
| 5,500,916 | A | * | 3/1996 | Cirelli et al. ............ 385/37 |
| 5,732,102 | A |   | 3/1998 | Bouadma |
| 6,035,089 | A | * | 3/2000 | Grann et al. ............ 385/129 |
| 6,292,292 | B1 | * | 9/2001 | Garito et al. ............ 359/341.5 |
| 6,303,041 | B1 |   | 10/2001 | Laming et al. |
| 6,459,533 | B1 |   | 10/2002 | Clapp et al. |

(Continued)

FOREIGN PATENT DOCUMENTS

KR    0024484    7/1996

OTHER PUBLICATIONS

'Thermooptic Planar Polymer Bragg Grating OADM's with Broad Tuning Range' Eldada et al., IEEE Photonics Technology Letters, vol. 11, No. 4, Apr. 1999, pp. 448-450.

(Continued)

*Primary Examiner*—Tina M Wong
*Assistant Examiner*—Rhonda S Peace
(74) *Attorney, Agent, or Firm*—Ladas & Parry LLP

(57) ABSTRACT

Provided is an optical device having an optical waveguide including an organic Bragg grating sheet. The optical device includes a cladding layer, and an optical waveguide. The cladding layer is formed on a substrate, and the optical waveguide is formed within the cladding layer. The optical waveguide includes a core layer and an organic Bragg grating sheet located within the core layer. The organic Bragg grating sheet has a refractive index higher than that of the core layer to reflect or transmit light having a predetermined wavelength. Accordingly, light propagates through the optical waveguide with high reflectance and low loss. Besides, a high performance tunable wavelength filter or tunable dispersion compensator may be constructed by forming a thermal electrode on the optical waveguide, forming a tapered optical waveguide, or forming a chirped organic Bragg grating sheet in the middle of the core layer of the optical waveguide.

10 Claims, 10 Drawing Sheets

U.S. PATENT DOCUMENTS

| | | | |
|---|---|---|---|
| 6,748,138 B2 * | 6/2004 | Wang et al. | 385/37 |
| 6,925,098 B2 * | 8/2005 | Deacon | 372/20 |
| 7,292,753 B2 * | 11/2007 | Cohen et al. | 385/37 |
| 2002/0018620 A1 * | 2/2002 | Koyama et al. | 385/37 |
| 2002/0122648 A1 | 9/2002 | Mule' et al. | |
| 2002/0136494 A1 * | 9/2002 | Yazaki et al. | 385/37 |
| 2002/0197013 A1 * | 12/2002 | Liu et al. | 385/37 |
| 2003/0068130 A1 * | 4/2003 | Gao | 385/37 |
| 2004/0071401 A1 * | 4/2004 | Eldada et al. | 385/37 |
| 2004/0208466 A1 * | 10/2004 | Mossberg et al. | 385/129 |
| 2005/0008295 A1 * | 1/2005 | Grunnet-Jepsen et al. | 385/37 |
| 2005/0141811 A1 * | 6/2005 | Yang et al. | 385/37 |

OTHER PUBLICATIONS

'Tunable wavelength filters with Bragg gratings in polymer waveguides' Oh et al., Applied Physics Letters, vol. 73, No. 18, Nov. 1998, pp. 2543-2545.

'Integrated Multichannel OADM's Using Polymer Bragg Grating MZI's' Eldada et al., IEEE Photonics Technology Letters, vol. 10, No. 10, Oct. 1998, pp. 1416-1418.

'Polymeric wavelength filters with polymer gratings' Oh et al., Applied Physics Letters, vol. 72, No. 13, Mar. 1998, pp. 1559-1561.

* cited by examiner

OPTICAL DEVICE HAVING OPTICAL WAVEGUIDE INCLUDING ORGANIC BRAGG GRATING SHEET

CROSS-REFERENCE TO RELATED PATENT APPLICATION

This application claims the benefit of Korean Patent Application Nos. 10-2005-0120173, filed on Dec. 8, 2005, and 10-2006-0018871, filed on Feb. 27, 2006, in the Korean Intellectual Property Office, the disclosure of which is incorporated herein in its entirety by reference.

BACKGROUND OF THE INVENTION

1. Field of the Invention

The present invention relates to an optical device, and more particularly, to an optical device having an optical waveguide including an organic Bragg grating sheet.

2. Description of the Related Art

In general, various conventional technologies have been used to manufacture an organic Bragg grating for an optical device. The various conventional technologies include replication, molding, embossing, stamping, e-beam writing, lithography, photochemical processing, and the like. The first six technologies are commonly used to manufacture surface relief gratings, and the photochemical processing is used to manufacture surface relief gratings or volume index gratings.

A representative example of an organic surface relief grating and application thereof includes a polymeric wavelength filter with a polymer Bragg grating for an optical waveguide, which is manufactured by integrating high-refractive-index resol gratings on a core layer of a low-loss polymer optical waveguide (Min-Cheol Oh et al., Polymeric wavelength filters with polymer grating, Applied Physics Letters, Vol. 72 No. 13, 1559 (1998)). Besides, a tunable wavelength filter is produced using a thermal electrode and a thermo-optic effect (Min-Cheol Oh et al., Tunable wavelength filters with Bragg Gratings in polymer waveguides, Applied Physics Letter, Vol. 73 No. 18, 2543 (1998)). The high-refractive-index resol gratings are manufactured by a phase mask and photolithography.

For a representative example of organic volume index gratings and application thereof, a Bragg-grating writing process is performed on a planar polymer optical waveguide using two-beam interference and corresponding photolocking of an allied signal optical polymer, and the resulting product is applied to an optical device such as a multi-channel optical add/drop multiplexer (OADM) (Louay Eldada et al., Integrated Multichannel OADMs Using Polymer Bragg Gratings MZIs, IEEE Photonics Technology Letters, Vol. 10 No. 10, 1416 (1998), Louay Eldada et al., Thermooptic Planar Polymer Bragg Grating OADMs with Broad Tuning Ranage, IEEE Photonics Technology Letters, Vol 11 No. 4, 448 (1999)).

SUMMARY OF THE INVENTION

The present invention provides an optical device having an optical waveguide including in the middle portion of a core layer a Bragg grating sheet having a refractive index higher than that of the core layer.

According to an aspect of the present invention, there is provided an optical device including a cladding layer formed on a substrate; and an optical waveguide formed within the cladding layer. The optical waveguide may include a core layer and an organic Bragg grating sheet located within the core layer, and the organic Bragg grating sheet has a refractive index higher than that of the core layer to reflect or transmit light with a predetermined wavelength.

The core layer may include a lower core layer and an upper core layer, and the organic Bragg grating sheet may be located between the upper core layer and the lower core layer. The organic Bragg grating sheet may have a thickness not exceeding ½ of an entire thickness of the core layer. The organic Bragg grating sheet may include a residue layer and bars on the residue layer, and the bars may be arranged at a constant interval or chirped.

The residue layer may have a thickness greater than or the same as zero but not exceeding a thickness of the organic Bragg grating sheet.

According to another aspect of the present invention, there is provided an optical device including a cladding layer formed on a substrate; and an optical waveguide formed within the cladding layer. The optical waveguide includes a lower core layer, an upper core layer and an organic Bragg grating sheet located between the upper core layer and the lower core layer; and the organic Bragg grating sheet has a refractive index higher than refractive indices of the upper and lower core layers to reflect or transmit light with a predetermined wavelength. The optical device may include a thermal electrode formed on the optical waveguide, so that the optical device is used as a tunable wavelength filter or a tunable dispersion compensator.

The optical waveguide may be a tapered optical waveguide having a width or thickness changing along an optical axis. The organic Bragg grating sheet may be a tapered organic Bragg grating sheet having a width or thickness changing along an optical axis. The thermal electrode may be a tapered thermal electrode having a width or thickness changing along an optical axis. The organic Bragg grating sheet may include bars arranged at a constant interval along an optical axis. The organic Bragg grating sheet may be a chirped organic Bragg grating sheet including bars arranged at a varying interval along an optical axis.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
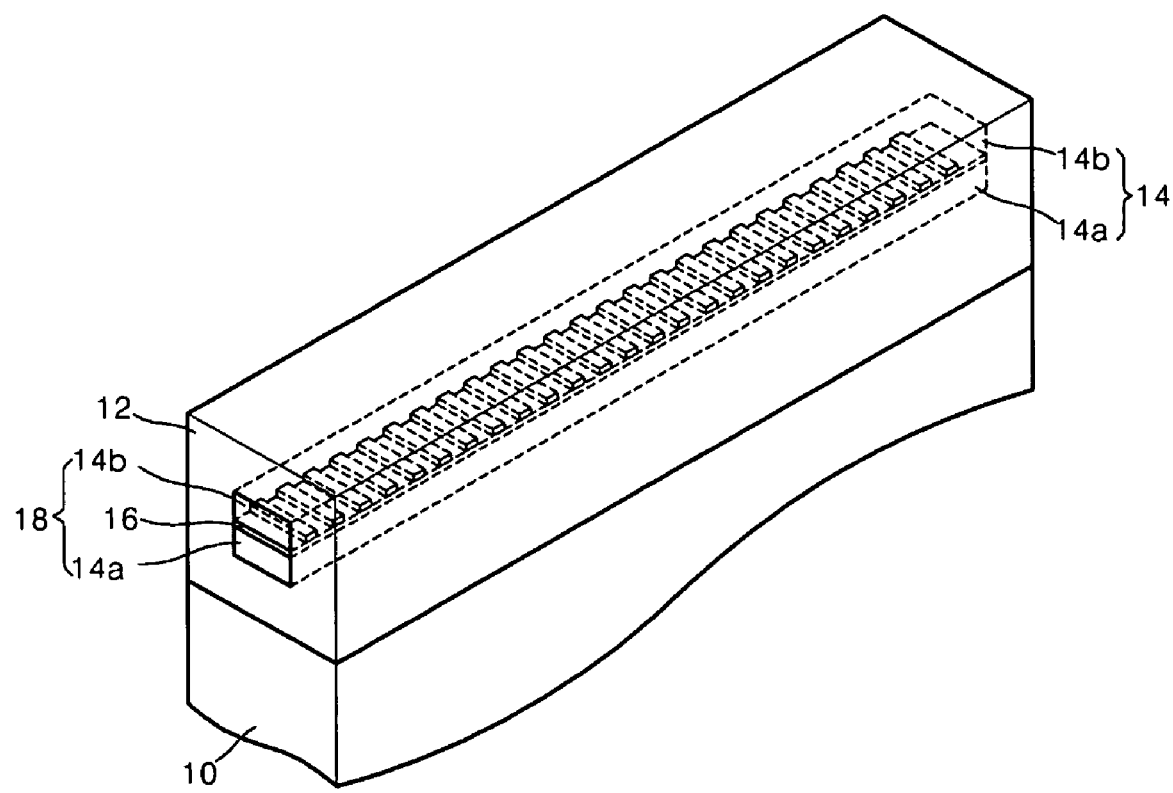
FIG. 1 is a perspective sectional view of an optical device having an optical waveguide including an organic Bragg grating sheet according to the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thickness of layers and regions are exaggerated for clarity.

FIG. 1 is a perspective sectional view of an optical device having an optical waveguide including an organic Bragg grating sheet according to the present invention.

Specifically, the optical device according to the present invention includes a cladding layer 12 formed on a substrate 10, and a planar optical waveguide 18 formed in the middle of the cladding layer 12. The optical waveguide 18 is an organic core waveguide. A very thin organic Bragg grating sheet 16 having a refractive index higher than that of a core layer 14 is formed near the central surface of the optical waveguide 18.

The core layer 14 includes a lower core layer 14a and an upper core layer 14b. The organic Bragg grating sheet 16 is located between the lower core layer 14a and the upper core layer 14b. The total thickness of the organic Bragg grating sheet 16 is the same as or less than ½ of the entire thickness of the core layer 14. Although a cross-section of the optical waveguide 18 is illustrated as a quadrangular shape, namely, as a channel shape in FIG. 1, it may have a stair-shaped quadrangular form, namely, a ridge shape.

The optical waveguide (core waveguide 18) includes the core layer 14 having a higher refractive index than that of the cladding layer 12, which surrounds the core layer 14, so that light propagates through the core layer 14 by total internal reflection. The optical waveguide 18 including the organic Bragg grating sheet 16 effectively reflects or transmits light with a predetermined wavelength.

Figure 2:
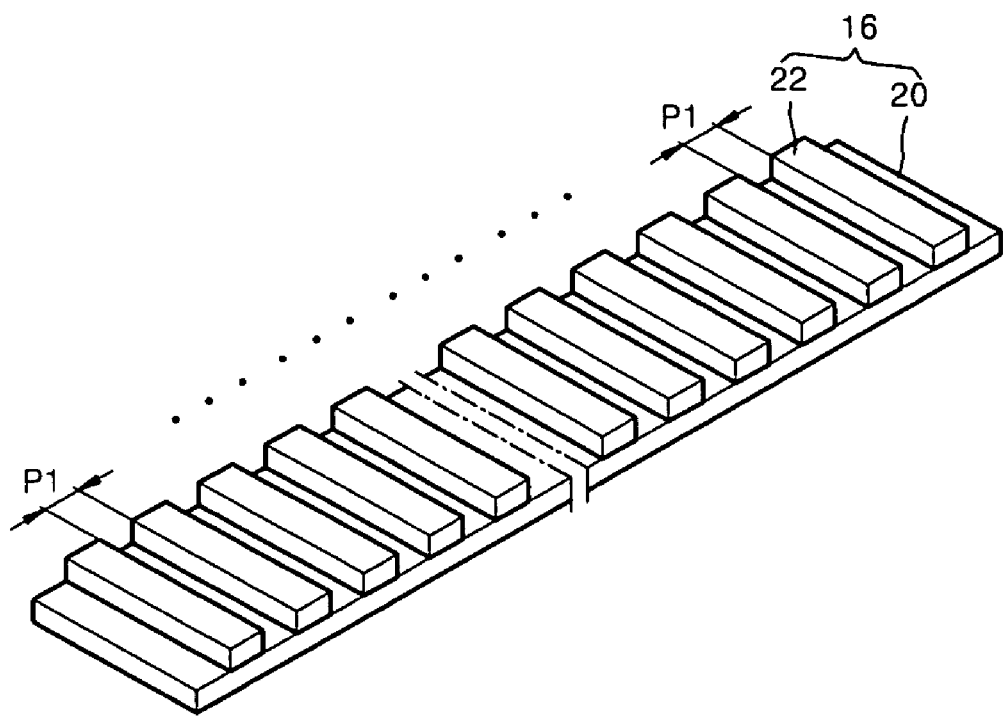
FIGS. 2 and 3 are enlarged perspective views of the organic Bragg grating sheet of FIG. 1.
Figure 3:
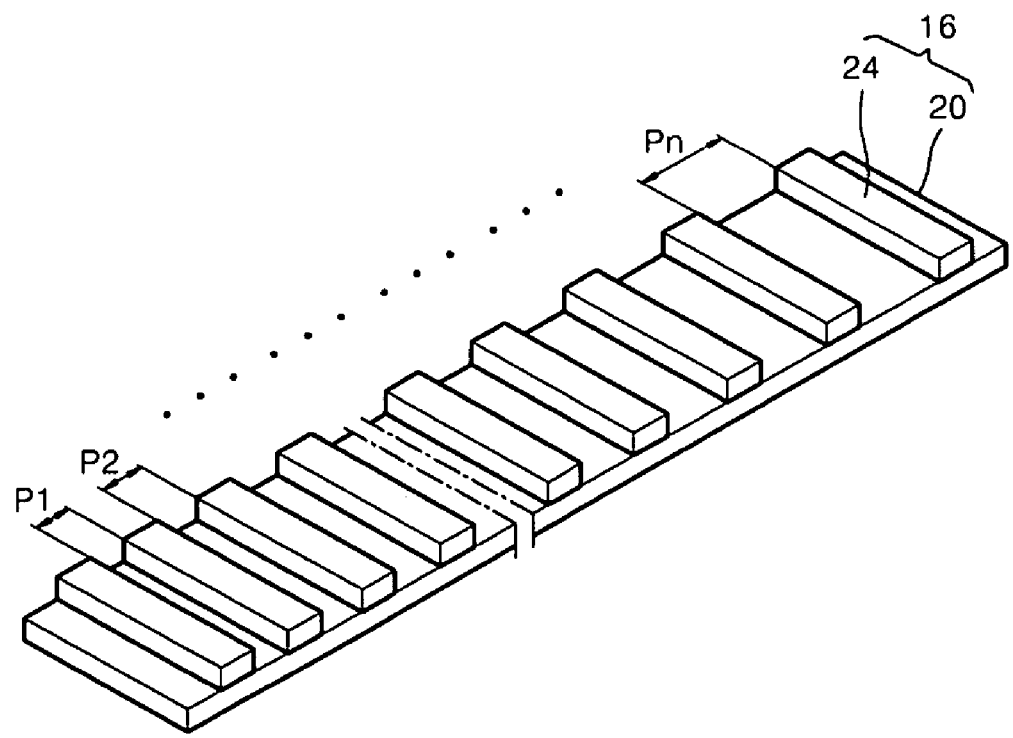

FIGS. 2 and 3 are enlarged perspective views of the organic Bragg grating sheet of FIG. 1.

Specifically, FIGS. 2 and 3 illustrate two kinds of organic Bragg grating sheets 16 formed near the central surface of the optical waveguide 18, respectively. In FIG. 2, the organic Bragg grating sheet 16 has bars 22 arranged on a residue layer 20 with a constant interval (P1). That is, the organic Bragg grating sheet 16 of FIG. 2 has bars 22 arranged with a constant interval P1. In FIG. 3, the organic Bragg grating sheet 16 has chirped bars 24 arranged on the residue layer 20 with a varying interval. The organic Bragg grating sheet 16 of FIG. 3 has chirped bars 24 arranged with an interval gradually varying from P1, P2 . . . up to Pn.

The residue layer 20 in FIGS. 2 and 3 appears when the organic Bragg grating sheet 16 is produced by imprinting or the like. The thickness of the residue layer 20 may be adjusted or removed by etching or the like in order to effectively control an effective refractive index. The total thickness of the organic Bragg grating sheet 16 including the residue layer 20 is less than ½ of the entire thickness of the core layer 14. The thickness of the residue layer 20 is greater than or the same as zero but does not exceed the thickness of the organic Bragg grating sheet 16.

Figure 4:
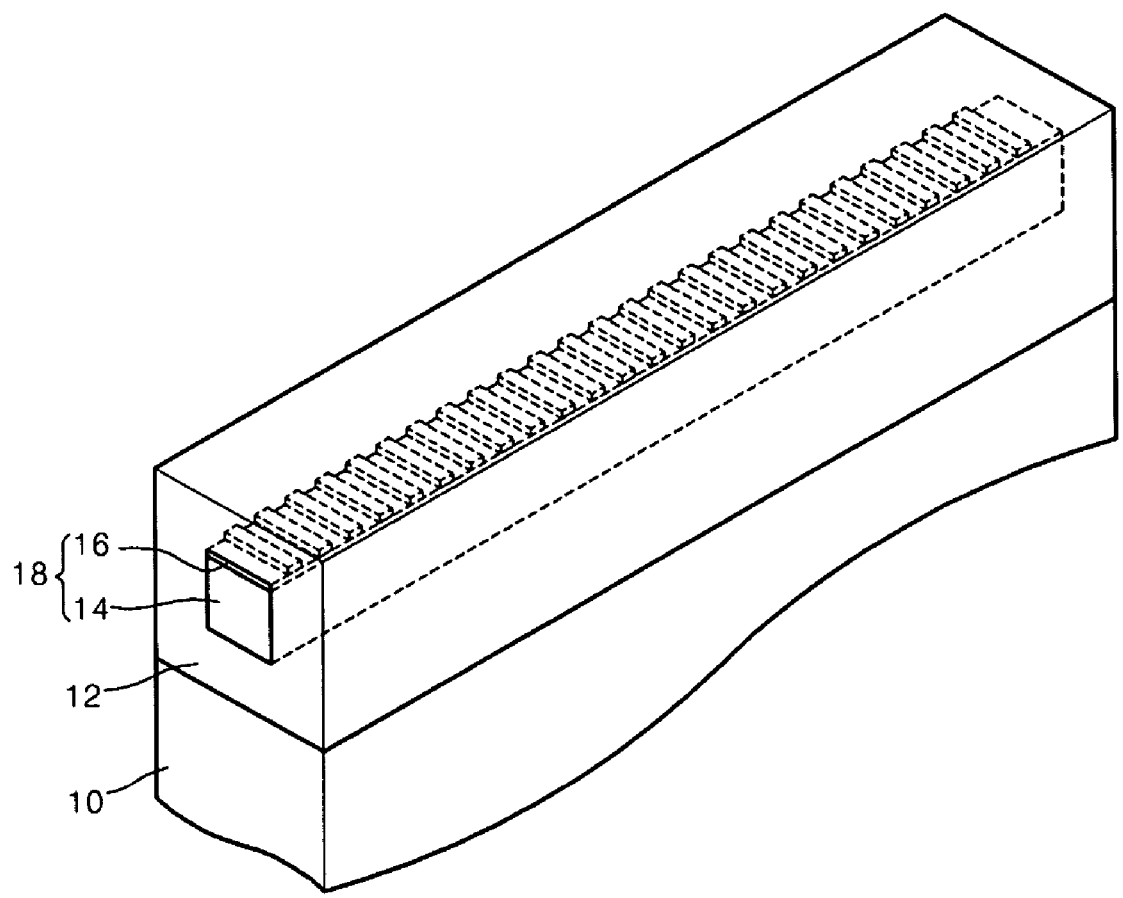
FIG. 4 is a view of a conventional optical device having an organic Bragg grating sheet on a surface of an optical waveguide, which is illustrated for comparison with the present invention.

FIG. 4 is a view of a conventional optical device including an organic Bragg grating sheet formed on the surface of an optical waveguide for the purpose of comparison with the present invention.

Specifically, in FIG. 4, the same reference numerals are used for the same elements of FIG. 1. In FIG. 4, the organic Bragg grating sheet 16 is formed on the surface of the optical waveguide 18, namely, on the upper surface of the core layer 14 for the comparison with the present invention.

Figure 5:
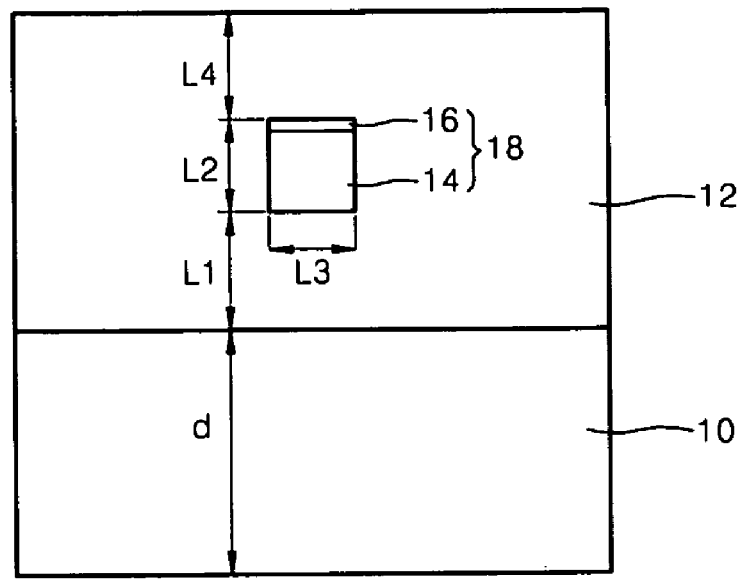
FIGS. 5 and 6 are schematic cross-sectional views of the conventional optical device of FIG. 4 and an optical device of FIG. 1 according to the present invention for a light propagation characteristic experiment, respectively.
Figure 6:
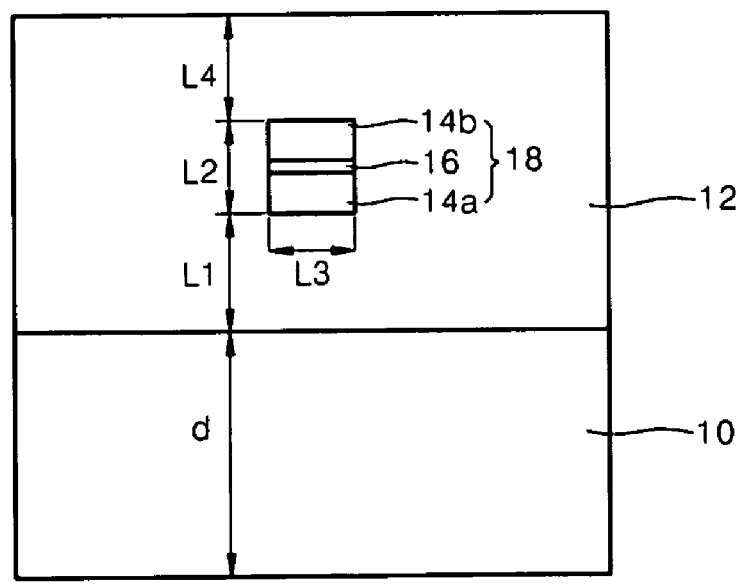

FIGS. 5 and 6 are schematic cross-sectional views of the conventional optical device of FIG. 4 and the optical device of FIG. 1 according to the present invention for light propagation characteristic experiment, respectively. In FIGS. 5 and 6, the same reference numerals are used for the same elements of FIGS. 1 and 4.

Specifically, optical waveguides 18 having Bragg grating sheets 16 of the optical devices illustrated in FIGS. 5 and 6 were tested for propagation characteristics of light with a wavelength of 1550 nm in a fundamental transverse magnetic (TM) mode. FIG. 5 illustrates a conventional optical device having an organic Bragg grating sheet 16 formed on a core layer constituting an optical waveguide, and FIG. 6 illustrates an optical device according to the present invention, having an organic Bragg grating sheet 16 formed in the middle of a core layer constituting an optical waveguide.

Referring to FIGS. 5 and 6, the experiment has been performed on the condition that: refractive indices of a silicon substrate 10, a cladding layer 12, a core layer 14, and an organic Bragg grating sheet 16 are 3.48, 1.43, 1.45, and 1.52, respectively; the thickness d of the substrate 10 is 30 µm, and vertical and horizontal lengths L2 and L3 of the optical waveguide 18 are 7 µm such that a cross-sectional area of the optical waveguide 18 is 49 µm$^2$; and a distance (or thickness) L1 between the lower surface of the optical waveguide 18 and the lower surface of the cladding layer 12 (i.e., the upper surface of the substrate 10) is 13 µm, a distance L4 (or thickness) between the upper surfaces of the optical waveguide 18 and the cladding layer 12 is 13 µm, and the thickness of the organic Bragg grating sheet 16 is 0.375 µm.

Figure 7:
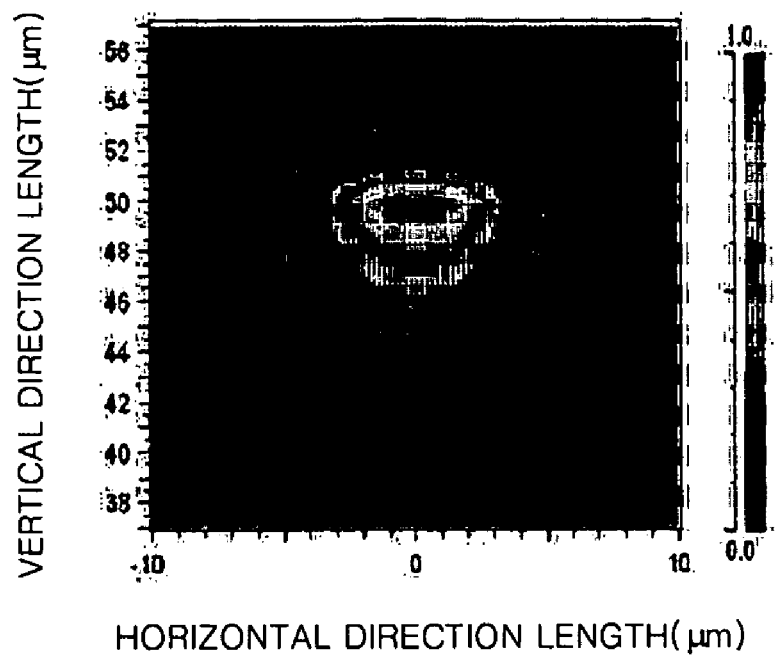
FIGS. 7 and 8 are graphs illustrating intensity profiles of optical modes of the optical devices of FIGS. 5 and 6, respectively.
Figure 8:
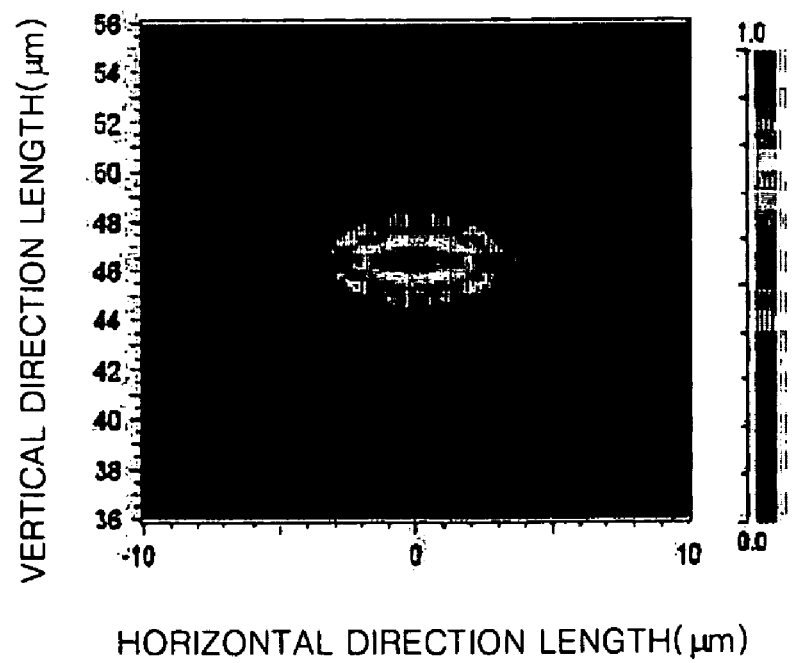

FIGS. 7 and 8 are views illustrating the intensity profiles of the optical modes of the optical devices of FIGS. 5 and 6, respectively.

Specifically, FIGS. 7 and 8 illustrate the intensity profiles of a TM fundamental mode when light with a wavelength of 1550 nm is propagated through an optical waveguide having a length of 1 mm. In FIGS. 7 and 8, the x-axis represents a length in a horizontal direction, and the y-axis represents a length in a vertical direction.

As illustrated in FIG. 7, according to the conventional optical device, a fundamental optical mode is lopsided to one side. In contrast to this, according to the optical device of the present invention, the fundamental optical mode is effectively confined to a core layer, and thus light is effectively confined to the core layer and swiftly propagates through the core layer. Accordingly, it is revealed that light having propagated through the optical waveguide with an organic Bragg grating sheet in the middle of the core layer of the optical device according to the present invention not only obtain high reflectance of a Bragg wavelength but also achieve only a very small light loss.

The exemplary application of an optical device of FIG. 1 will now be described. According to the present invention, in order to control an effective refractive index of an optical waveguide including an organic Bragg grating sheet depending on a wavelength, a thermal electrode having a predetermined shape may be formed on the light waveguide, a tapered optical waveguide may be formed, or a chirped organic Bragg grating sheet may be formed in the middle of the core layer of the optical waveguide. Thus, the optical device according to the present invention may be constructed as a tunable wavelength filter tuning a wavelength or a wavelength bandwidth of reflected light or a tunable dispersion compensator tuning a colour dispersion amount of an optical signal.

Figure 9:
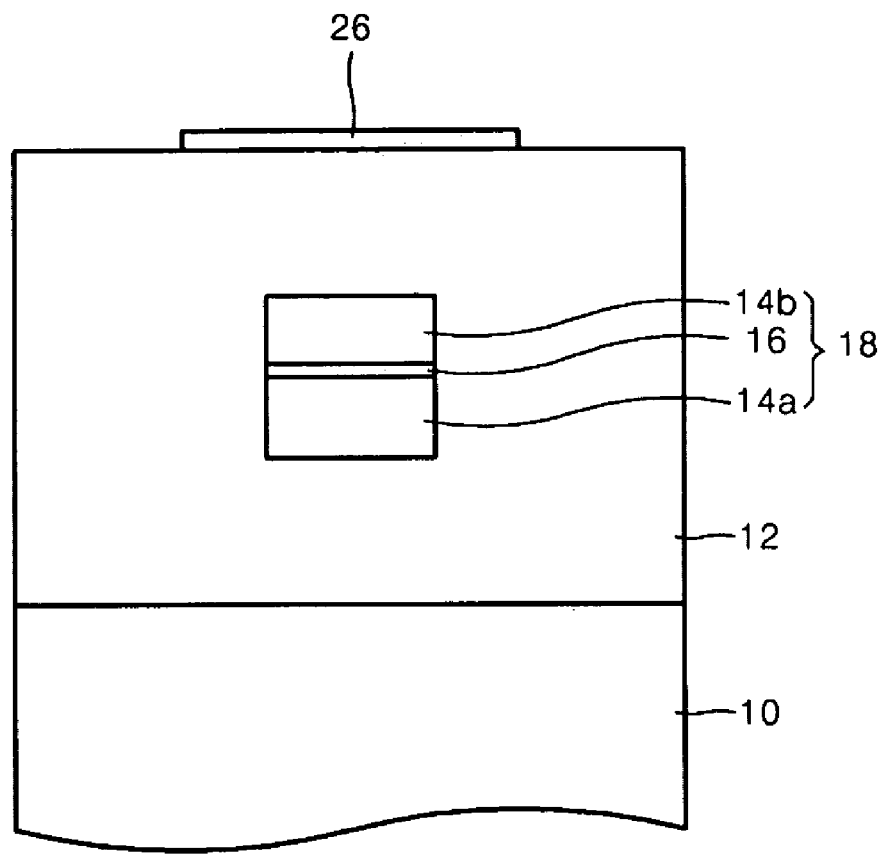
FIG. 9 is a cross-sectional view of a tunable wavelength filter or a tunable dispersion compensator having a thermal electrode on an optical waveguide with an organic Bragg grating sheet, illustrated as an exemplary application of an optical device according to the present invention.

FIG. 9 is a cross-sectional view of an exemplary application of an optical device according to the present invention, which illustrates a tunable wavelength filter or a tunable dispersion compensator having a thermal electrode on an optical waveguide with an organic Bragg grating sheet.

Specifically, in FIG. 9, the same reference numerals are used for the same elements of FIG. 1. As illustrated in FIG. 9, a tunable wavelength filter or a tunable dispersion compensator using a thermo-optic effect is constructed by forming a thermal electrode 26 on an optical waveguide 18 having an organic Bragg grating sheet 16 in the middle of the core layer 14. In other words, in FIG. 9, illustrated is a tunable wavelength filter that tunes a wavelength by allowing the thermal electrode 26 formed on the optical waveguide 18 to control an effective refractive index of the optical waveguide 18 using the thermo-optic effect, or a tunable dispersion compensator tuning a colour dispersion amount of an optical signal in the same manner.

FIGS. 10 through 13 are enlarged cross-sectional views of various applications of an optical device according to the present invention, which illustrate a tunable wavelength filter or a tunable dispersion compensator having a thermal electrode on an optical waveguide with an organic Bragg grating sheet having bars at a constant interval.

Specifically, in FIGS. 10 through 13, the same reference numerals are used for the same elements of FIG. 1. Also, in FIGS. 10 through 13, a thermal electrode 26 and 26a is schematically depicted and may be formed anywhere if it is formed above and below the optical waveguide 18.

Figure 10:
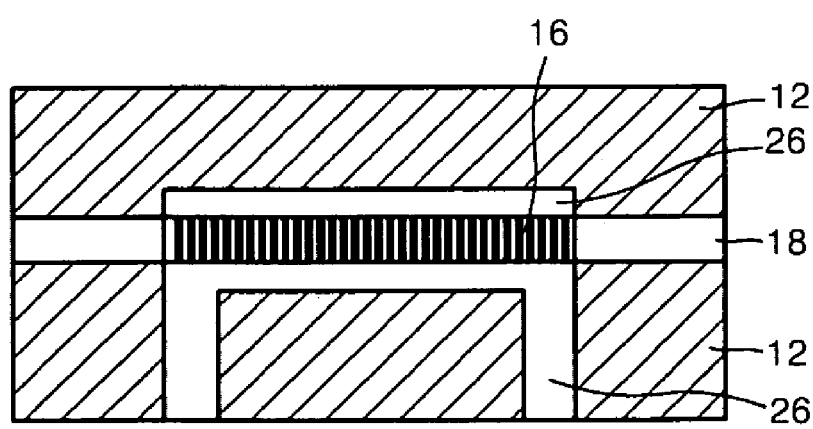
FIGS. 10 through 13 are enlarged cross-sectional views of a tunable wavelength filter or a tunable dispersion compensator having a thermal electrode on an optical waveguide with an organic Bragg grating sheet having bars arranged with a constant interval, illustrated as various applications of an optical device according to the present invention.

FIG. 10 is a view of a tunable wavelength filter or a tunable dispersion compensator having the same structure as that in FIG. 9. That is, FIG. 10 illustrates realizing a tunable wavelength filter or a tunable dispersion compensator by providing an optical waveguide 18 that has an organic Bragg grating sheet 16, and a thermal electrode 26 above and below the optical waveguide 18 in order to use a thermo-optic effect.

Figure 11:
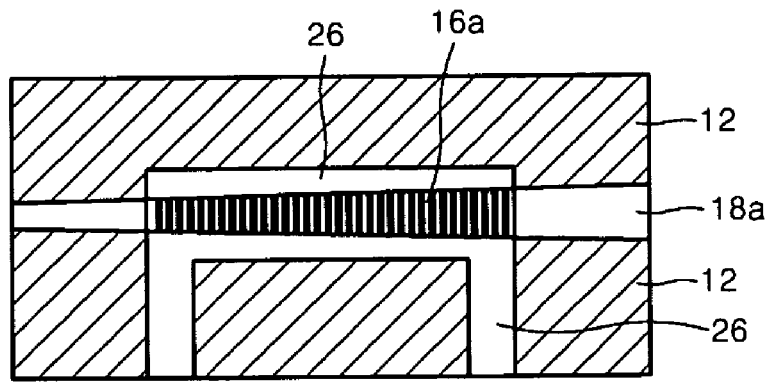

FIG. 11 is a view of a tunable wavelength filter or a tunable dispersion compensator having a tapered optical waveguide 18a and a tapered Bragg grating sheet 16a whose widths or thicknesses vary along an optical axis. The tapered optical waveguide 18a and the tapered organic Bragg grating sheet 16a are formed by etching an optical waveguide 18 including an organic Bragg grating sheet 16 when forming the optical waveguide 18. Accordingly, FIG. 11 illustrates the tunable wavelength filter that increases the bandwidth of a Bragg reflected wave by gradually changing an effective refractive index along the axis of the optical waveguide 18a, or the tunable dispersion compensator that tunes a colour dispersion amount according to a wavelength.

Figure 12:
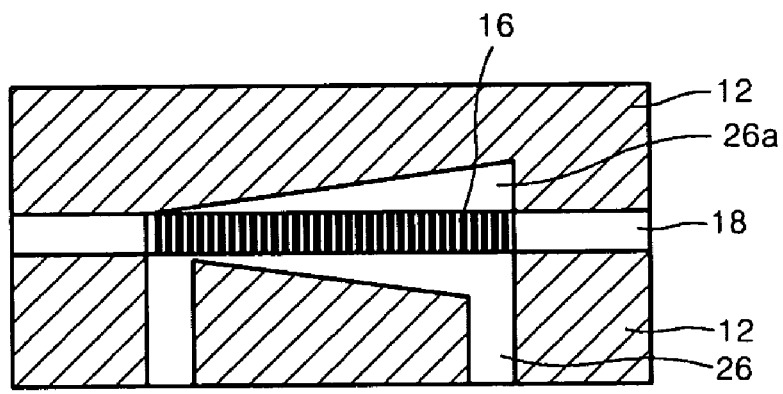

FIG. 12 is a view of a tunable wavelength filter or a tunable dispersion compensator that is the same as that in FIG. 10, except for a tapered thermal electrode 26a having a width or thickness changing along an optical axis. The tapered thermal electrode 26a is formed by gradually changes the width or thickness of a thermal electrode 26 when forming the thermal electrode 26. Accordingly, FIG. 12 illustrates the tunable wavelength filter or the tunable dispersion compensator gradually tuning an effective refractive index using a thermo-optic effect as resistance gradually changes along the optical waveguide 18.

Figure 13:
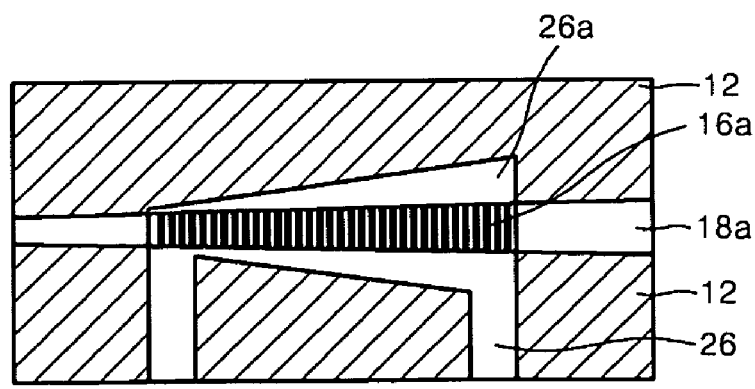

FIG. 13 is a view of a combination of the structures illustrated in FIGS. 11 and 12, which illustrate a tunable wavelength filter or a tunable dispersion compensator including a tapered optical waveguide 18a, a tapered Bragg grating sheet 16a, and a tapered thermal electrode 26a.

FIGS. 14 through 17 are enlarged cross-sectional views of various applications of an optical device according to the present invention, which illustrate a tunable wavelength filter or a tunable dispersion compensator having a thermal electrode formed on an optical waveguide with a chirped organic Bragg grating sheet including bars arranged with a varying interval.

Specifically, in FIGS. 14 through 17, the same reference numerals are used for the same elements of FIGS. 1 and 9, and FIGS. 10 through 13. In FIGS. 14 through 17, a thermal electrode 26, 26a is schematically depicted and may be formed anywhere if it is formed above and below the optical waveguide 18.

Figure 14:
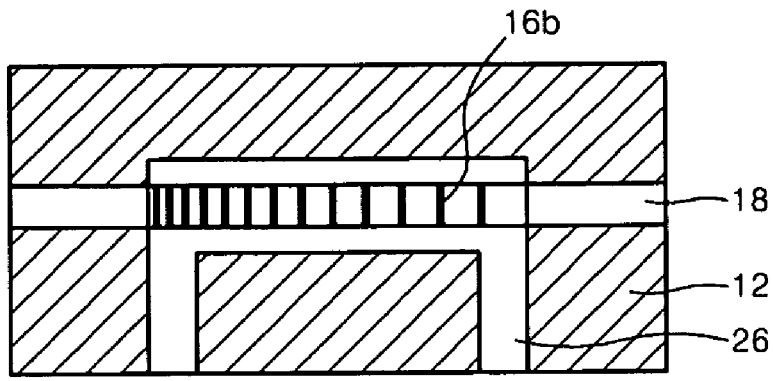
FIGS. 14 through 17 are enlarged cross-sectional views of a tunable wavelength filter or a tunable dispersion compensator having a thermal electrode on an optical waveguide with a chirped organic Bragg grating sheet having bars arranged with a varying interval, illustrated as various applications of an optical device according to the present invention.
Figure 15:
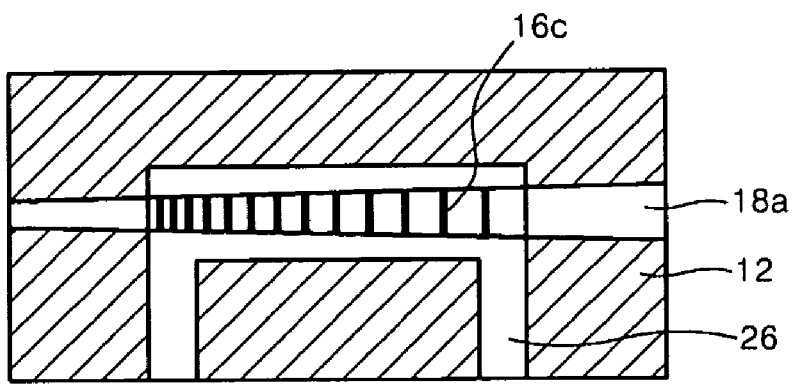

FIG. 14 is a view of a tunable wavelength filter or a tunable dispersion compensator which is the same as that in FIG. 10, except for a chirped organic Bragg grating sheet 16a having bars arranged with a varying interval. The chirped organic Bragg grating sheet 16b is formed when a Bragg grating sheet 16 is formed. FIG. 15 is a view of a tunable wavelength filter or a tunable dispersion compensator using a chirped and tapered organic Bragg grating sheet 16c and a tapered optical waveguide 18a. Namely, the tunable wavelength filter or the tunable dispersion compensator in FIG. 15 is constructed using both structures in FIGS. 14 and 11.

Figure 16:
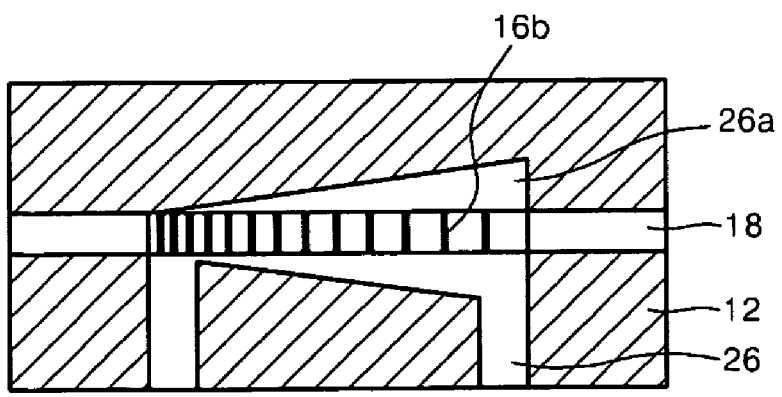

FIG. 16 is a view of a tunable wavelength filter or a tunable dispersion compensator using a tapered thermal electrode 26a and a chirped Bragg grating sheet 16 having bars arranged with a varying interval. That is, the tunable wavelength filter or the tunable dispersion compensator in FIG. 16 is constructed using the structures illustrated in FIGS. 14 and 12.

Figure 17:
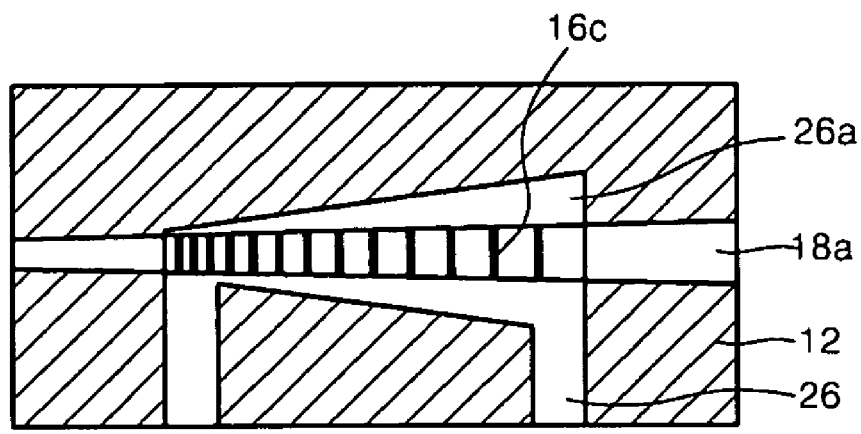

FIG. 17 is a view of a tunable wavelength filter or a tunable dispersion compensator using a chirped and tapered organic Bragg grating sheet 16c having bars arranged with a varying interval, a tapered optical waveguide 18a, and a tapered thermal electrode 26a. Thus, the tunable wavelength filter or the tunable dispersion compensator in FIG. 17 is constructed using structures in FIGS. 15 and 13.

In FIGS. 10 through 17, the tunable wavelength filters or the tunable dispersion compensators with various structures are illustrated as various applications of the optical device according to the present invention. The tunable wavelength filter or the tunable dispersion compensator may be constructed, if necessary, by any combination of: the optical waveguide 18 that is a tapered optical waveguide 18a having a width or thickness changing along an optical axis; the thermal electrode 26 that is a tapered thermal electrode 26a having a width or thickness changing along an optical axis; and the organic Bragg grating sheet 16 selected from the group consisting of: a tapered organic Bragg grating sheet 16a having a width or thickness changing along an optical axis, an organic Bragg grating sheets 16a having bars arranged with a constant interval along an optical axis, and a chirped organic Bragg grating sheet 16a having bars arranged with a varying interval along an optical axis.

Figure 18:
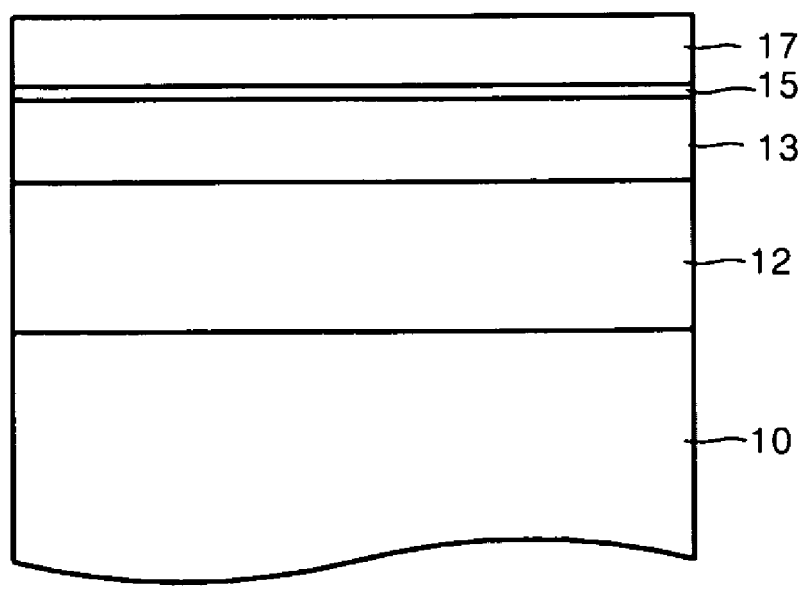
FIGS. 18 and 19 are cross-sectional views illustrating processes of a method of forming an optical device according to the present invention.
Figure 19:
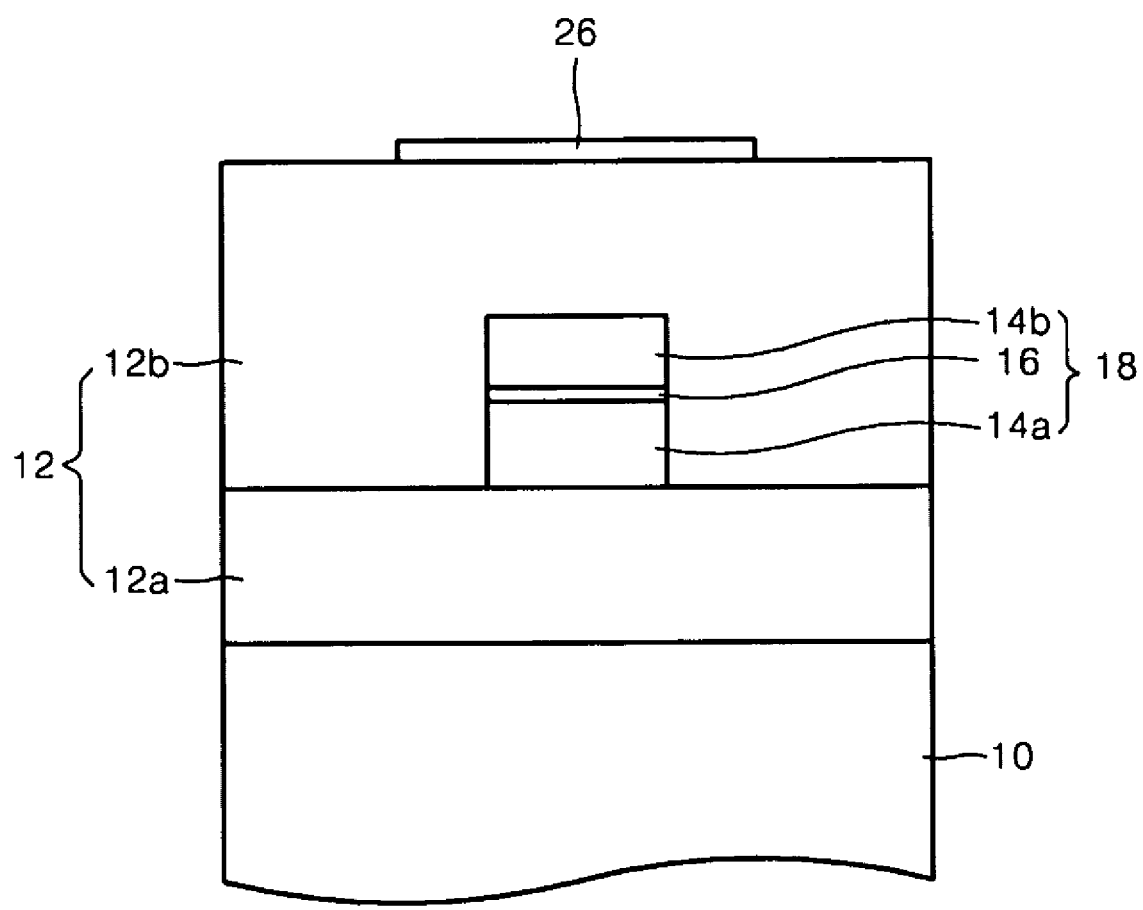

FIGS. 18 and 19 are cross-sectional views illustrating the processes of a method of forming an optical device according to the present invention. FIGS. 18 and 19 are views for specifically describing processes of forming, in the middle portion of a core layer 14, an organic Bragg grating sheet 16 having a refractive index higher than that of the core layer 14.

Referring to FIG. 18, a lower cladding layer 12a is formed on a four-inch substrate 10, for example, on a quartz substrate. The lower cladding layer 12a may be a high polymer layer. The lower cladding layer 12a is formed by performing spin coating of a solution whose product name is Exguide ZPU13-430 (a low-loss thermosetting polymer by ChemOptics Co., which has a refractive index 1.430 at a wavelength 1.55 µm) on the substrate to make a spin coated layer having a thickness 13 µm, and thermo-hardening the spin coated layer in a nitrogen atmosphere oven at 250° C. for two hours.

A first core layer 13 is formed on the lower cladding layer 12a. The first core layer 13 is formed by performing spin coating of a solution whose product name is Exguide ZPU13-450 (a low-loss thermosetting polymer by ChemOptics Co., which has a refractive index 1.450 at an optical wavelength 1.55 µm) on the lower cladding layer 12a to make a spin coated layer having a thickness 3.5 µm, and thermo-hardening the spin coated layer in a nitrogen atmosphere oven at 250° C. for two hours.

Next, a solution named Exguide Co-152 (a low-loss polymer for ultraviolet-based nano-imprinting by ChemOptics Co., which has a refractive index 1.520 at a wavelength 1.55 µm) is sprinkled in drops onto a pre-manufactured silicon (Si) Bragg grating sheet stamp (not shown). The substrate 10 including thereon the first core layer 13 is flipped over and pressed on the Si Bragg grating sheet stamp. Next, the ultraviolet (UV) light is illuminated in a substrate direction to cure the substrate 10, so that an organic Bragg grating layer 15 is formed. Subsequently, the Si Bragg grating sheet stamp and the substrate 10 are separated from each other. Next, a second core layer 17 is formed by performing spin coating of a solution whose product name is Exguide ZPU13-450 on the organic Bragg grating sheet 16 of the substrate 10 to make a spin coated layer having a thickness of 3.5 µm and thermo-hardening the spin coated layer in a nitrogen atmosphere oven at 250° C. for two hours.

Referring to FIG. 19, the second core layer 17, the organic Bragg grating layer 15, and the first core layer 13 are etched to a width 7 µm (horizontal length) and to a depth 7 µm (vertical length), using photolithography and $O_2$ reactive ion etching, to form an optical waveguide 18 including an upper core layer 14b, an organic Bragg grating sheet 16, and a lower core layer 14a. The organic Bragg grating sheet 16 is formed between the upper core layer 14b and the lower core layer 14a.

Next, the spin coating of a solution, Exguide ZPU13-430, is performed on the substrate 10 that has formed the optical waveguide 18 to make a spin-coated layer having a thickness of 13 µm, and the spin-coated layer is thermo-hardened in a nitrogen atmosphere oven at 250° C. for two hours, to form an upper cladding layer 12b. A thermal electrode 26 may be formed on the upper cladding layer 12b if necessary.

As described so far, the optical device according to the present invention includes the optical waveguide including,
in the middle of a core layer, the organic Bragg grating sheet having a refractive index higher than that of the core layer. Accordingly, the optical device according to the present invention may allow light to propagate with high reflectance and low loss.

Besides, the optical device of the present invention may contribute to construction of a high performance tunable wavelength filter or tunable dispersion compensator by forming a thermal electrode on an optical waveguide, producing a tapered optical guide, or forming a chirped organic Bragg grating sheet in the middle of the core layer of the optical waveguide.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical device comprising:
a cladding layer formed on a substrate; and
an optical waveguide formed within the cladding layer,
wherein the optical waveguide comprises a lower core layer, an upper core layer and an organic Bragg grating sheet located between the upper and lower core layers,
the organic Bragg grating sheet comprises a residue layer and bars on the residue layer in which the residue layer has a thickness greater than zero and less than a thickness of the bars such that the thickness of the residue layer is adjusted to effectively control the effective refractive index of the entire organic Bragg grating sheet,
the refractive index of the entire organic Bragg grating sheet is higher than the refractive indices of the upper and lower core layers,
the organic Bragg grating sheet has a thickness not exceeding one half of the entire thickness of the upper and lower core layers, and
the organic Bragg grating sheet has a higher refractive index than that of both the upper and lower core layers to reflect or transmit light having a predetermined wavelength.

2. The optical device of claim 1, wherein the bars are arranged with a constant interval or chirped.

3. The optical device of claim 2, wherein the residue layer has a thickness not exceeding the thickness of the organic Bragg grating sheet.

4. An optical device used as a tunable wavelength filter or a tunable dispersion compensator, the optical device comprising:
a cladding layer formed on a substrate;
an optical waveguide formed within the cladding layer; and
a thermal electrode formed on the optical waveguide,
wherein the optical waveguide comprises a lower core layer, an upper core layer, and an organic Bragg grating sheet including a residue layer and bars on the residue layer located between the upper core layer and the lower core layer,
the organic Bragg grating sheet comprises a residue layer and bars on the residue layer in which the residue layer has a thickness greater than zero and less than a thickness of the bars such that the thickness of the residue layer is adjusted to effectively control the effective refractive index of the entire organic Bragg grating sheet, the refractive index of the entire organic Bragg grating sheet is higher than the refractive index of the core layer, the organic Bragg grating sheet has a thickness not exceeding one half of the entire thickness of the core layer, and the organic Bragg grating sheet has a refractive index higher than the refractive indices of the upper and lower core layers to reflect or transmit light having a predetermined wavelength.

5. The optical device of claim 4, wherein the optical waveguide comprises a tapered optical waveguide having a width or thickness changing along an optical axis.

6. The optical device of claim 4, wherein the organic Bragg grating sheet comprises a tapered organic Bragg grating sheet having a width or thickness changing along an optical axis.

7. The optical device of claim 4, wherein the thermal electrode comprises a tapered thermal electrode having a width or thickness changing along an optical axis.

8. The optical device of claim 4, wherein the organic Bragg grating sheet includes bars arranged with a constant interval along an optical axis.

9. The optical device of claim 4, wherein the organic Bragg grating sheet comprises a chirped organic Bragg grating sheet having bars arranged at a varying interval along an optical axis.

10. The optical device of claim 4, wherein the optical device comprises any combination of:

the optical waveguide that is a tapered optical waveguide having a width or thickness changing along an Optical axis;

the thermal electrode that is a tapered thermal electrode having a width or thickness changing along an optical axis; and the organic Bragg grating sheet that is one grating selected from the group consisting of a tapered organic Bragg grating sheet having a width or thickness changing along an optical axis, an organic Bragg grating sheet having bars arranged with a constant interval along an optical axis, and a chimed organic Bragg grating sheet having bars arranged with a varying interval along an optical axis.

* * * * *